US011921465B2

(12) United States Patent
Nakazawa

(10) Patent No.: US 11,921,465 B2
(45) Date of Patent: Mar. 5, 2024

(54) ELECTRONIC WATCH

(71) Applicant: Seiko Epson Corporation, Toyko (JP)

(72) Inventor: Toshinori Nakazawa, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 588 days.

(21) Appl. No.: 17/152,953

(22) Filed: Jan. 20, 2021

(65) Prior Publication Data

US 2021/0223745 A1 Jul. 22, 2021

(30) Foreign Application Priority Data

Jan. 21, 2020 (JP) ................................ 2020-007407

(51) Int. Cl.
*G04C 17/00* (2006.01)
*G04C 11/08* (2006.01)

(52) U.S. Cl.
CPC .......... *G04C 17/0058* (2013.01); *G04C 11/08* (2013.01)

(58) Field of Classification Search
CPC ..... G04C 17/0058; G04C 11/08; G04B 19/30
See application file for complete search history.

(56) References Cited

U.S. PATENT DOCUMENTS 4,236,240 A * 11/1980 Yoshida ............ G04C 17/0091 968/452
5,519,671 A 5/1996 Murakami et al.
5,984,485 A 11/1999 Poli et al.
6,821,014 B2 11/2004 Hiranuma et al.
7,242,639 B2 7/2007 Blondeau et al.
7,623,415 B2 11/2009 Raeber et al.
7,889,602 B2 2/2011 Behling et al.
2003/0016315 A1 1/2003 Ueno et al.
2003/0123332 A1 7/2003 Hiranuma et al.
2003/0174585 A1 9/2003 Igarashi et al.
2004/0047242 A1* 3/2004 Germiquet ............ G01D 7/002 368/11
2004/0125585 A1* 7/2004 Sung ...................... G04B 19/30 362/23.19
2007/0025186 A1* 2/2007 Gilomen ............... G04C 3/146 368/80
2007/0068245 A1 3/2007 Blondeau et al.
2007/0183264 A1 8/2007 Raeber et al.
2009/0015514 A1 1/2009 Suzuki et al.
(Continued)

FOREIGN PATENT DOCUMENTS

CN 1190201 A 8/1998
EP 1870786 A1 12/2007
(Continued)

*Primary Examiner* — Edwin A. Leon
*Assistant Examiner* — Kevin Andrew Johnston
(74) *Attorney, Agent, or Firm* — Harness, Dickey & Pierce, P.L.C.

(57) ABSTRACT

An electronic watch including an exterior case including an opening, a crystal disposed in the opening, an hour hand and a minute hand that indicate the time of day, a dial including an indicium, a pressure sensor configured to measure a pressure, and a controller configured to determine a water depth based on the output from the pressure sensor, indicate the water depth with the hour hand, and indicate an elapsed time with the minute hand, the elapsed time being time elapsed after the predetermined water depth value is exceeded.

6 Claims, 8 Drawing Sheets

(56) References Cited

U.S. PATENT DOCUMENTS

| | | | | |
|---|---|---|---|---|
| 2009/0154296 | A1* | 6/2009 | Behling | G04B 19/247 368/10 |
| 2009/0185451 | A1 | 7/2009 | Rochat | |
| 2009/0185452 | A1* | 7/2009 | Veuthey | G04G 21/02 368/69 |
| 2013/0051192 | A1* | 2/2013 | Oshio | G04B 19/04 368/205 |
| 2018/0081406 | A1* | 3/2018 | Kita | H04R 9/06 |
| 2021/0131638 | A1 | 5/2021 | Sato et al. | |
| 2022/0107074 | A1 | 4/2022 | Sato et al. | |

FOREIGN PATENT DOCUMENTS

| | | | | |
|---|---|---|---|---|
| GB | 2280049 | A | 1/1995 | |
| JP | H06-186355 | A | 7/1994 | |
| JP | H07-020266 | A | 1/1995 | |
| JP | H07-077585 | A | 3/1995 | |
| JP | H07-218656 | A | 8/1995 | |
| JP | 2000-111661 | A | 4/2000 | |
| JP | 2002-012190 | A | 1/2002 | |
| JP | 2002-181960 | A | 6/2002 | |
| JP | 3329817 | B2 | 9/2002 | |
| JP | 2003-194968 | A | 7/2003 | |
| JP | 2004-101525 | A | 4/2004 | |
| JP | 2006-275948 | A | 10/2006 | |
| JP | 2007-286075 | A | 11/2007 | |
| JP | 2009-156868 | A | 7/2009 | |
| JP | 3203279 | U | 3/2016 | |
| JP | 2016-170399 | A | 9/2016 | |
| WO | 2006-103965 | A1 | 10/2006 | |
| WO | WO-2018021456 | A1 * | 2/2018 | G04B 39/00 |
| WO | 2019-245030 | A1 | 12/2019 | |

* cited by examiner

ELECTRONIC WATCH

The present application is based on, and claims priority from JP Application Serial Number 2020-007407, filed Jan. 21, 2020, the disclosure of which is hereby incorporated by reference herein in its entirety.

BACKGROUND

1. Technical Field

The present disclosure relates to an electronic watch.

2. Related Art

A wristwatch type electronic watch used for diving is required to display water depth, diving time, and the like, in addition to the time. For example, a diving watch of Japanese Unexamined Patent Application Publication JP-A-2004-101525 is provided with a pressure sensor and a bezel, and the water depth detected by the pressure sensor is indicated by a long hand. The bezel has an annular shape surrounding a circular dial, and the bezel includes graduations for a water depth.

In addition, an electronic watch including graduations for a diving time engraved in a rotating bezel, is also known in general. Such a rotating bezel may be provided with a reverse rotation prevention mechanism such as that described in Japanese Unexamined Patent Application JP-A-6-186355, in order to avoid the displaying of an elapsed time shorter than the actual elapsed time due to erroneous operation or the like.

However, in a diving watch with such a bezel, the display area including the dial may be made smaller in order to suppress an increase in size, which may make it difficult to read information from the diving watch.

SUMMARY

An electronic watch includes, a case including an opening, a crystal disposed in the opening, a first hand and a second hand that indicate a time, a dial including a indicium, a pressure sensor configured to measure a pressure, and a controller configured to determine a water depth based on an output from the pressure sensor, indicate a water depth with the first hand, and indicate an elapsed time with the second hand, the elapsed time being time elapsed after a predetermined water depth value is exceeded.

DESCRIPTION OF EXEMPLARY EMBODIMENTS

First Exemplary Embodiment

Figure 1:
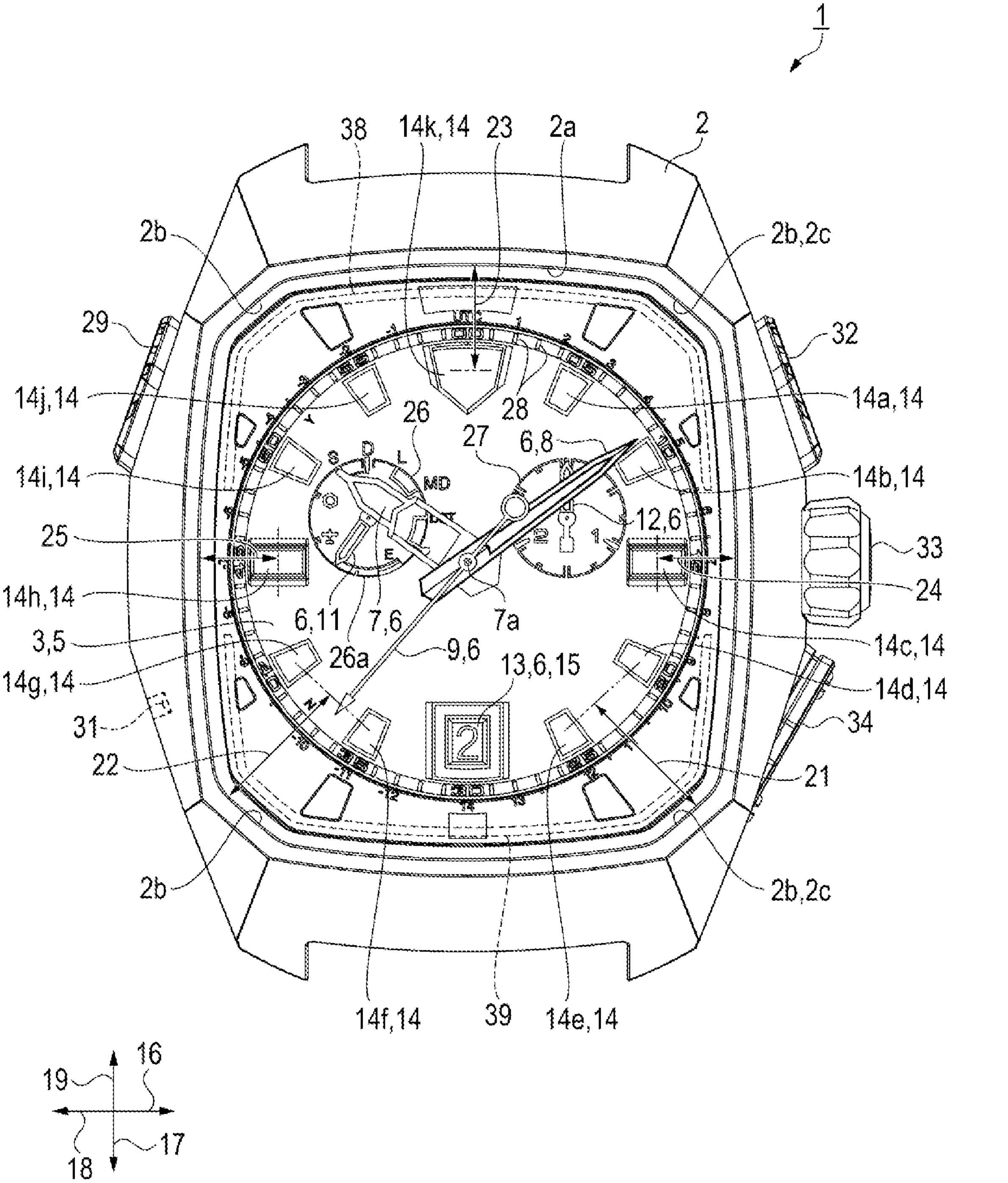
FIG. 1 is a front view illustrating an electronic watch according to a first embodiment.
Figure 2:
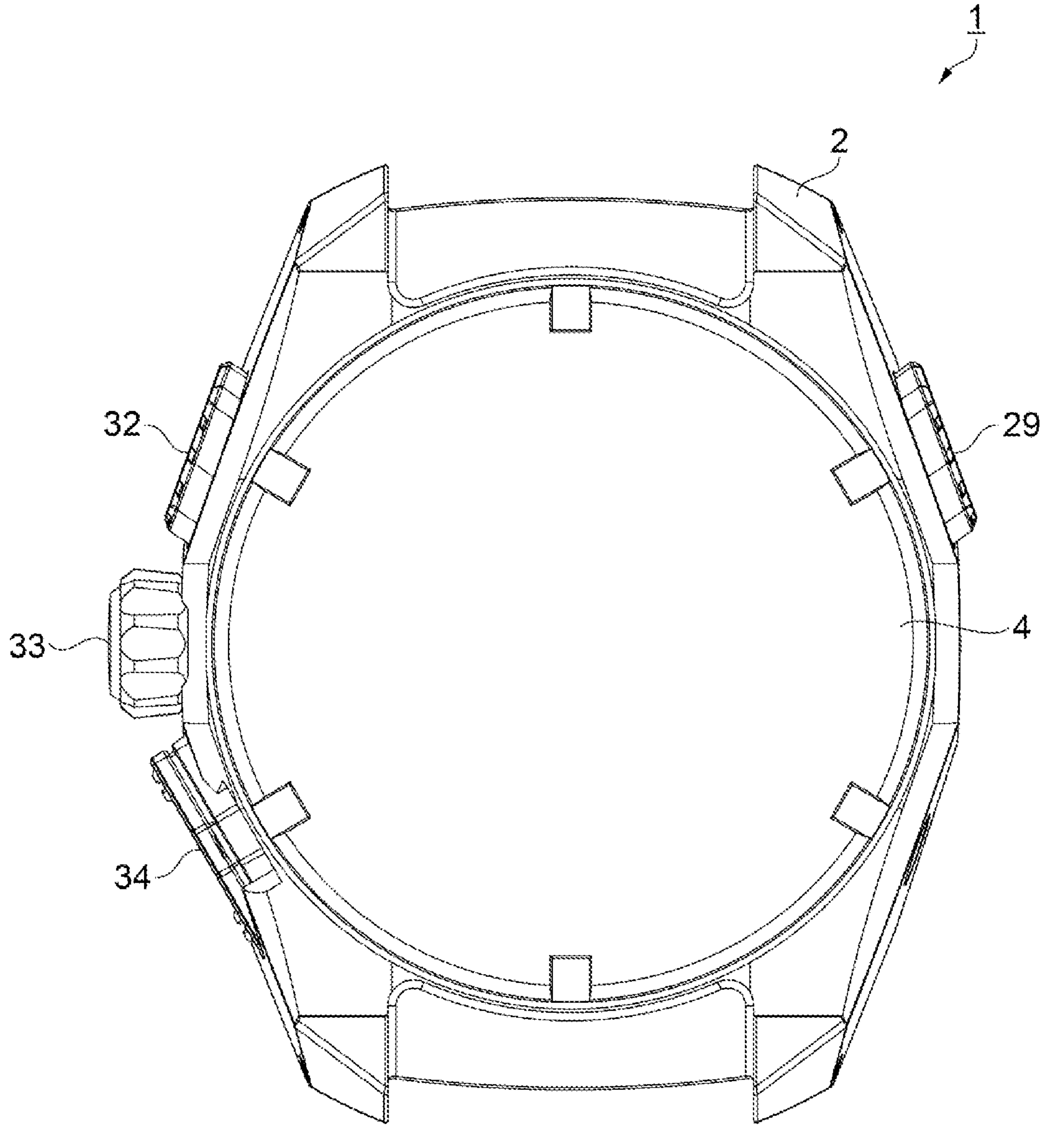
FIG. 2 is a rear view illustrating an electronic watch.

As illustrated in FIGS. 1 to 7, an electronic watch 1 is a quartz diver's watch that is worn on a user's wrist. A quartz diver's watch is one type of diving watch. The electronic watch 1 includes an exterior case 2, a crystal 3, and a case back 4. A dial 5, a movement, and hands 6 are provided in the exterior case 2. The hands 6 are driven by the movement. The hands 6 include an hour hand 7 as a first hand, a minute hand 8 as a second hand, a seconds hand 9, a first secondary hand 11, and a second secondary hand 12. In addition, a date indicator 13 that displays a date is provided in the exterior case 2.

The exterior case 2 includes an opening 2*a*. The crystal 3 is disposed in the opening 2*a*. The hour hand 7, minute hand 8 and seconds hand 9 indicate a time of day. The dial 5 includes indicia 14. The indicia 14 are graduations for the hour hand 7, the minute hand 8, and the seconds hand 9. The indicia 14 are arranged circumferentially from the 1 o'clock hour mark 14*a* clockwise to the 12 o'clock hour mark 14*k*. A date window 15 for displaying a date indicator 13 is positioned between the five o'clock mark 14*e* and the 7 o'clock mark 14*f*. The date window 15 is a graduation at the position showing 6 o'clock.

As illustrated in FIG. 1, the hour hand 7, the minute hand 8, and the seconds hand 9 are center hands respectively attached to three hand axes provided through the dial 5 at the planar center position of the dial 5. Axis 7*a* is one of the hand axes. The first secondary hand 11 is provided in the first sub-dial 26 disposed in the 10 o'clock direction with respect to the planar center position of the dial 5. The 10 o'clock direction is the direction facing the 10 o'clock mark 14*i* with respect to the axis 7*a*. The second secondary hand 12 is provided in the second sub-dial 27 disposed in the 2 o'clock direction with respect to the planar center position of the dial 5. The 2 o'clock direction is the direction facing the 2 o'clock mark 14*b* with respect to the axis 7*a*.

The direction facing the 3 o'clock mark 14*c* with respect to the axis 7*a* of the hour hand 7 is referred to as the 3 o'clock direction 16. The direction facing the date window 15 with respect to the axis 7*a* of the hour hand 7 is referred to as the 6 o'clock direction 17. The direction facing the 9 o'clock mark 14*h* with respect to the axis 7*a* of the hour hand 7 is referred to as the 9 o'clock direction 18. The direction facing the 12 o'clock mark 14*k* with respect to the axis 7*a* of the hour hand 7 is referred to as the 12 o'clock direction 19. Further, the direction opposite the 12 o'clock direction 19 with respect to the axis 7*a* of the hour hand 7 is referred to as the 6 o'clock direction 17.

The opening 2*a* of the exterior case 2 is polygonal. Specifically, the opening 2*a* has a shape in which the square corner portion 2*b* is chamfered. The 3 o'clock direction 16, 6 o'clock direction 17, 9 o'clock direction 18 and 12 o'clock direction 19 of the opening 2*a* correspond to the sides of the polygon, each of which has a gentle curve.

Figure 7:
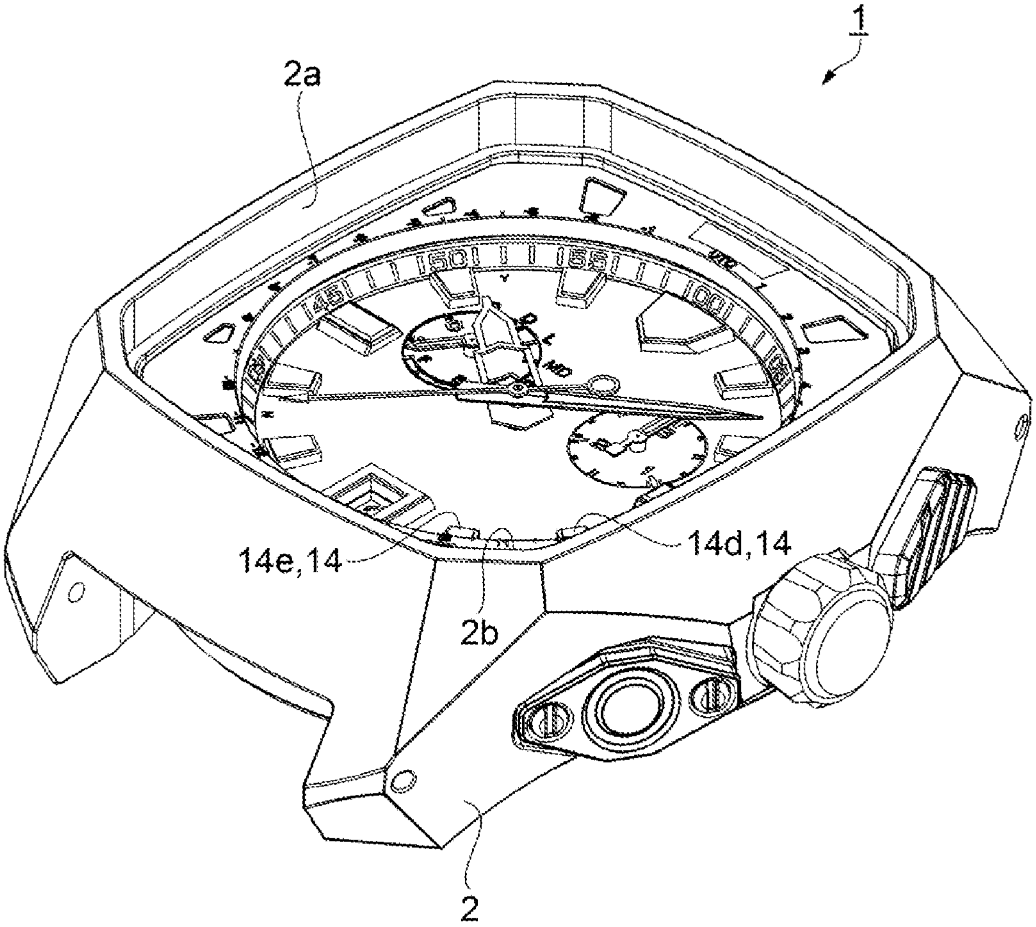
FIG. 7 is a perspective view of an electronic watch.
Figure 10:
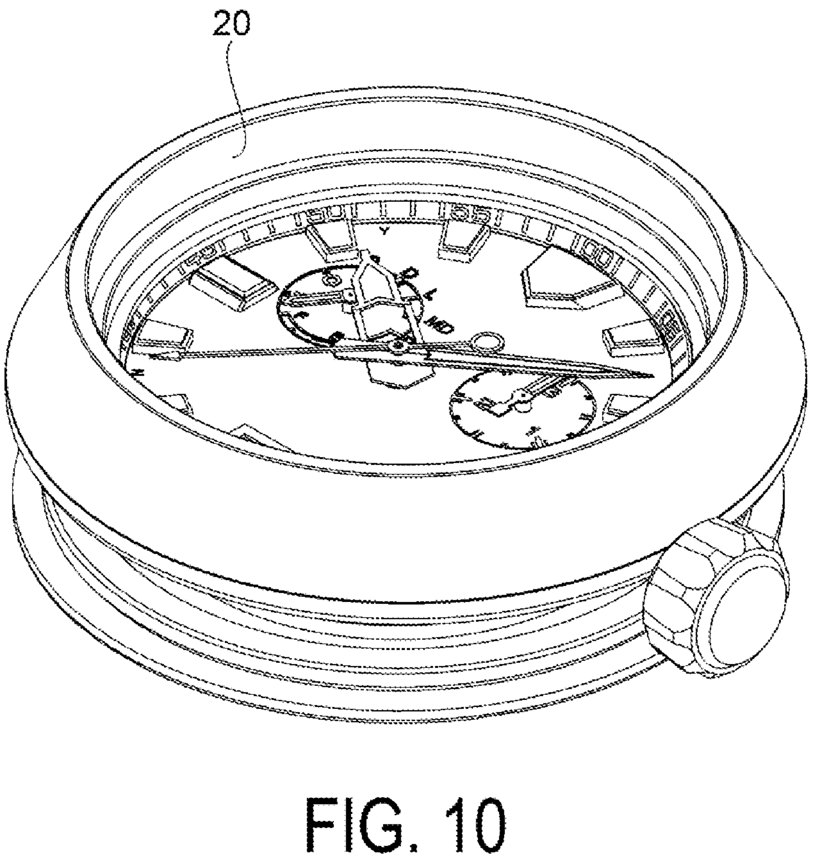
FIG. 10 is a perspective view of an electronic watch according to a comparative example.

The exterior case 2 includes a polygonal opening. Compared to when the opening 20 is circular as illustrated in FIG. 10, when the opening 2*a* is polygonal as illustrated in FIG. 7, the visible area, when viewed from the corner portion 2*b* of the opening 2*a*, is wider. Therefore, the indicia 14 on the dial 5 can be made easily visible. Specifically, when the opening 2a is polygonal, it is possible to reliably recognize the 4 o'clock mark 14d and the 5 o'clock mark at 14e. Note that FIGS. 7 and 10 are perspective views inclined at a predetermined angle with respect to the axial direction of the axis 7a of the hour hand 7. The predetermined angle is, for example, 35 degrees.

The polygonal opening 2a includes sides in the 3 o'clock direction 16 and 9 o'clock direction 18. The width of the exterior case 2 is short compared to a round opening having a radius that is the length from the axis 7a of the hour hand 7 to the inner wall of the exterior case 2 in a direction rotated 45 degrees clockwise about the axis 7a of the hour hand 7 with respect to the 12 o'clock direction 19. In other words, the width of the exterior case 2 is reduced in the 3 o'clock direction 16 and the 9 o'clock direction 18. By this way, it can be made more difficult for the exterior case 2 to bump into structural objects, such as rocks, when diving. Furthermore, since the width of the exterior case 2 in the 3 o'clock direction 16 and the 9 o'clock direction 18 is reduced, it becomes more difficult for the exterior case 2 to interfere when a user rotates their wrist backward, making it easy to move the wrist.

In FIG. 1, the distance from an intermediate point on the imaginary line connecting the centroid of the 4 o'clock mark 14d and the centroid of the 5 o'clock mark 14e to a case inner wall 2c is defined as a first distance 21. The distance from the intermediate point of the imaginary line connecting the centroid of the 7 o'clock mark 14f and the centroid of the 8 o'clock mark 14g to the case inner wall 2c is defined as a second distance 22. The distances from the centroid of the 12 o'clock mark 14k, the centroid of the 3 o'clock mark 14c, and the centroid of the 9 o'clock mark 14h to the case inner wall 2c are respectively defined as a third distance 23, a fourth distance 24, and a fifth distance 25.

The first distance 21 is greater than the third distance 23, the fourth distance 24, and the fifth distance 25. The second distance 22 is greater than the third distance 23, the fourth distance 24, and the fifth distance 25. In the embodiment, for example, the height of the case inner wall 2c is from 7 mm to 8 mm. The height of the case inner wall 2c indicates the length in the thickness direction of the crystal 3 of the case inner wall 2c. The third distance 23 is 5 mm to 6 mm, the fourth distance 24 is 3 mm to 4 mm, the fifth distance 25 is 3 mm to 4 mm, the first distance 21 is 8 mm to 9 mm, and the second distance 22 is 8 mm to 9 mm.

Because the first distance 21 is large, many of the marks of the indicia 14 are visible when viewing the dial 5 from a direction along a line passing through the axis 7a and an intermediate point between the 4 o'clock mark 14d and the 5 o'clock mark 14e. Because the second distance 22 is large, many of the marks of the indicia 14 are visible when viewing the dial 5 from a direction along a line passing through the axis 7a and an intermediate point between the 7 o'clock mark 14f and the 8 o'clock mark 14g.

Note that the first distance 21 to the fifth distance 25 are set to the distance between the centroid of each mark of the indicia 14 and the case inner wall 2c. In addition, the first distance 21 to the fifth distance 25 may be set to the distance from the location of each mark of the indicia 14 closest to the case inner wall 2c to the case inner wall 2c. At this time as well, the first distance 21 is greater than the third distance 23, the fourth distance 24, and the fifth distance 25. The second distance 22 is greater than the third distance 23, the fourth distance 24, and the fifth distance 25.

As illustrated in FIG. 1, the dial 5 is provided on the outer circumference thereof with graduations 28 divided into 60 equal parts. In the following description, the graduation 28 at the 12 o'clock position is referred to as a "0 minute" indicator 28, and each graduation 28 disposed in the clockwise direction thereafter is referred to as a "1 minute" to "59 minute" graduation 28.

The outer circumference of the first sub-dial 26 is provided with a remaining battery gage 26a, and a mark "S" and a mark "D" for indicating a diving mode. In the time display mode, in which the hour hand 7, the minute hand 8 and the seconds hand 9 display the current time, the hour hand 7 indicates the hour and the minute hand 8 indicates the minutes in the time indication. The first secondary hand 11 indicates the remaining battery gage 26a. In the diving mode, the first secondary hand 11 indicates the mark "S" or the mark "D". The diving mode is the mode used when the user dives. In this way, the first secondary hand 11 and the first sub-dial 26 function as a mode display for displaying an operating mode of the electronic watch 1.

The remaining battery gage 26a includes a mark "F" and a mark "E". In the figure, the mark "F" is hidden by the first secondary hand 11. "F" stands for Full, indicating that there is a high amount of battery remaining, in other words, that the battery voltage level is high, "E" stands for Empty, indicating a state in which the remaining battery is low.

The mark "S" is a mark, in the diving mode, for indicating that the user is diving in water of a relatively shallow depth, such as snorkeling or skin diving. The mark "D" is a mark, in the diving mode, for indicating that the user is diving in water of a deeper depth as compared to skindiving or the like. Hereinafter, the state in which the first secondary hand 11 indicates the mark "S" is defined as a Snorkeling mode or S mode, and the state indicating the mark "D" is defined as a Dive mode or D mode.

In the S mode or D mode, the hour hand 7 indicates the water depth. Based on the difference in the diving mode, the range of the water depth that can be displayed differs. In the S mode, the water depth indicated by one graduation, that is, a one minute graduation, is 10 cm. When the hour hand 7 is rotated one rotation, that is, 360 degrees, from the 12 o'clock position, that is, the 0 minute graduation 28, it is indicating that the water depth changed from a depth of 0 cm to a water depth of 600 cm, that is, a water depth of 6 m.

In the D mode, the water depth indicated by one graduation, that is, a one minute graduation, is 1 m, and when the hour hand 7 is rotated one rotation, that is, 360 degrees, from the 0 minute indicator 28, it is possible to indicate a water depth from 0 m to 60 m. In the S mode, when the water depth exceeds 6 m, the mode automatically transitions to the D mode. The first secondary hand 11 indicates the mark "D", and the hour hand 7 indicates a position of a water depth of 6 m, that is, the 6 minute graduation 28.

A mark "1", a mark "2" and a mark 3" are disposed in the second sub dial 27. Note that in the figure, the mark "3" is hidden by the second secondary hand 12. The mark "1", mark "2", and mark "3" respectively indicate that the hour hand 7 rotated 1, 2, or 3 turns. For example, in the water depth display mode, when the water depth is 70 m, the second secondary hand 12 indicates the mark "1", and the hour hand 7 indicates the water depth 10 m. At this time, it can be seen that 10 m is added to 60 m and the water depth is 70 m.

In the S or D mode, the minute hand 8 indicates the diving time. In the diving time display mode, the mark "1", mark "2", and mark "3" of the second sub-dial 27 indicate that the minute hand 8 rotated one turn, two turns, or three turns, respectively. For example, when the diving time is 80 minutes, the second secondary hand 12 indicates the mark "1" and the minute hand 8 indicates 20 minutes. At this time, it can be seen that 60 minutes is added to 20 minutes and the diving time is 80 minutes.

Figure 5:
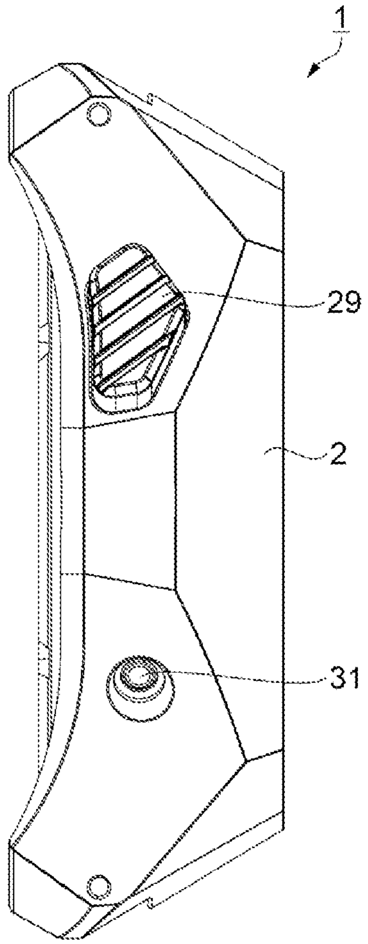
FIG. 5 is a side view, viewed from the 9 o'clock direction, illustrating an electronic watch.
Figure 6:
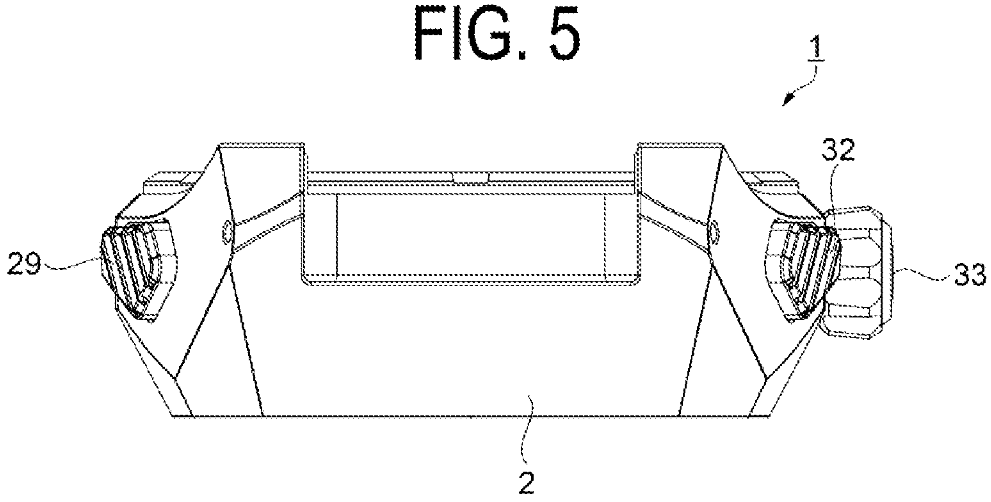
FIG. 6 is a side view, viewed from the 12 o'clock direction, illustrating an electronic watch.

As illustrated in FIGS. 1 and 5, a first button 29 and a water detection sensor 31 are provided on a side surface of the exterior case 2. The first button 29 is an element of an operation device for instructing a mode change, for example. The water detection sensor 31 is a sensor for detecting that the electronic watch 1 entered water or exited the water.

Figure 3:
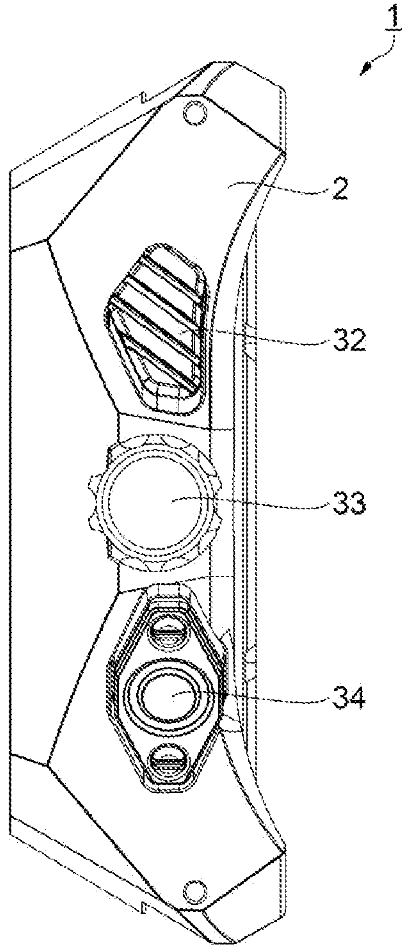
FIG. 3 is a side view, viewed from the 3 o'clock direction, illustrating an electronic watch.
Figure 4:
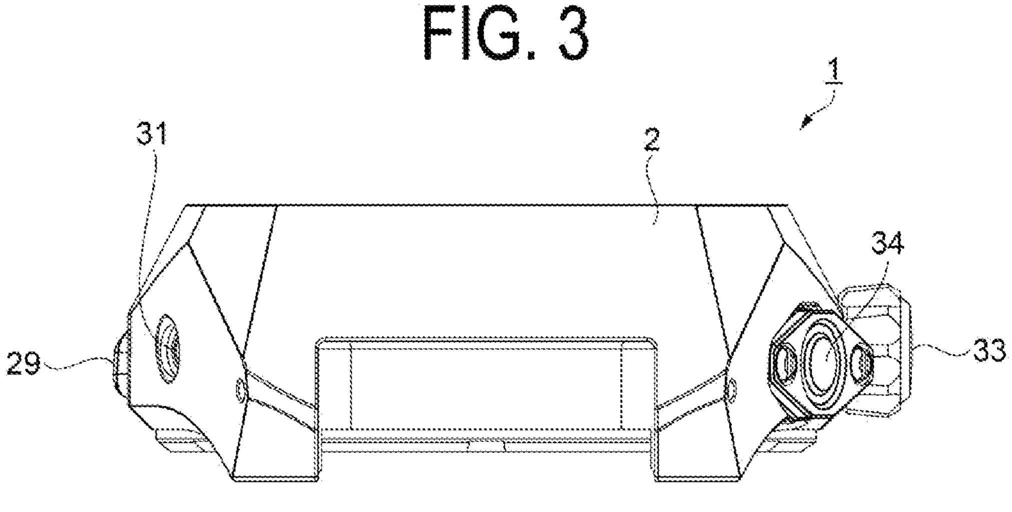
FIG. 4 is a side view, viewed from the 6 o'clock direction, illustrating an electronic watch.

As illustrated in FIGS. 1 and 3, a second button 32, a crown 33, and a pressure sensor 34 are provided on a side surface of the exterior case 2. The second button 32 is an element of an operation device for instructing a mode change. The crown 33 is an element of an operation device for adjusting the position of the hour hand 7, the minute hand 8, and the date indicator 13. The pressure sensor 34 measures the pressure of the water applied to the electronic watch 1.

When the user presses the first button 29 in the time display mode, the display mode switches to the diving time display mode. The display alternates between the diving time display mode and the water depth display mode by pressing the first button 29. When the second button 32 is pressed in the diving time display mode or the water depth display mode, the mode switches to the time display mode.

Figure 8:
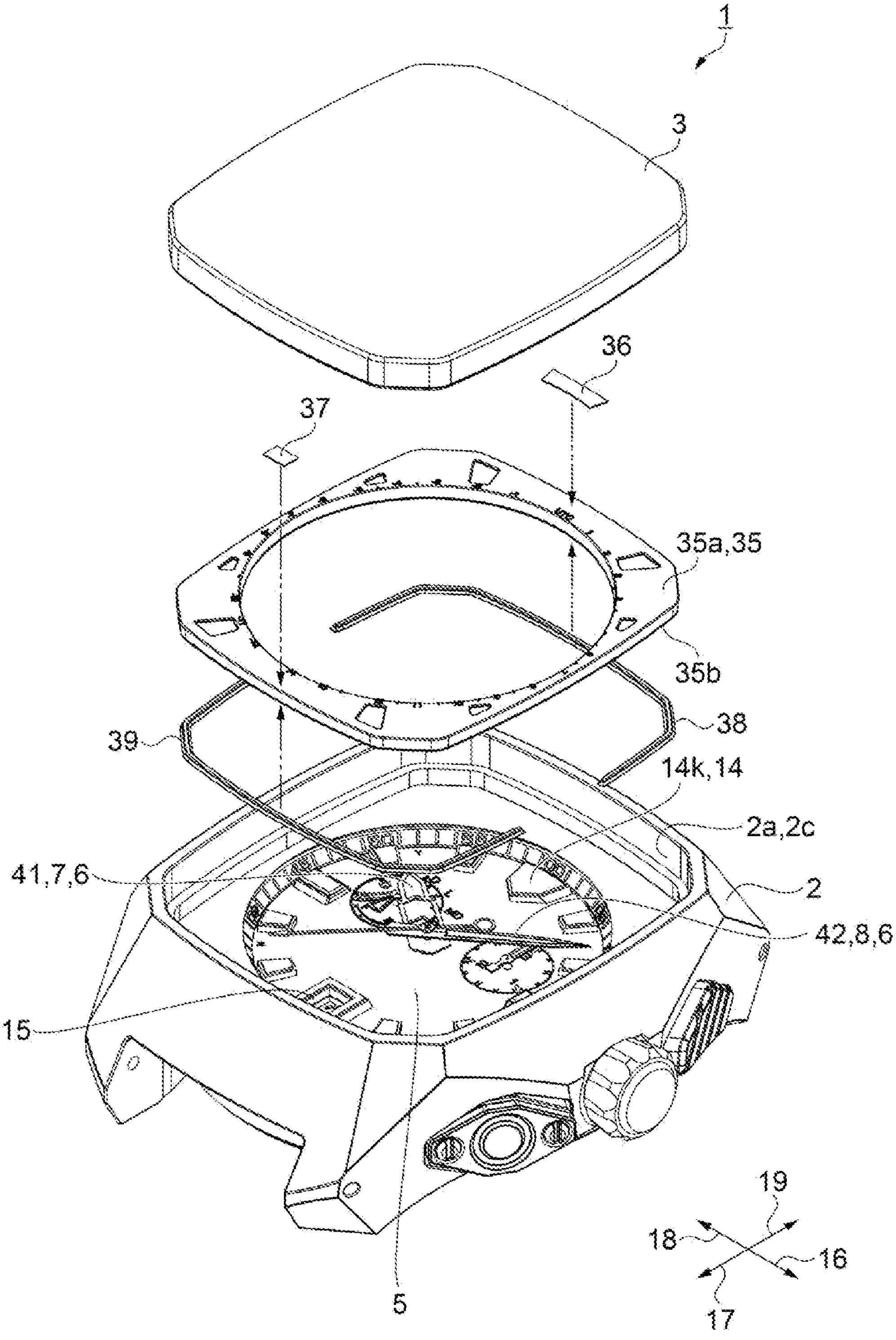
FIG. 8 is an exploded perspective view illustrating a structure of an electronic watch.

As illustrated in FIG. 8, a light-transmissive member 35 is disposed between the dial 5 and the crystal 3. In the light-transmissive member 35, a surface facing the crystal 3 is referred to as a first surface 35*a*, and a surface facing the dial 5 is referred to as a second surface 35*b*. The first surface 35*a* and the second surface 35*b* are in a front and rear relationship. The light-transmissive member 35 includes, on the first surface 35*a*, a first light emitting member 36 as a light emitting member and a second light emitting member 37 as a light emitting member. The first light emitting member 36 is disposed on the 12 o'clock direction 19 side of the 12 o'clock mark 14*k*. The second light emitting member 37 is disposed on the 6 o'clock direction 17 side of the date window 15.

The light-transmissive member 35 includes a third light emitting member 38 as a light emitting member and a fourth light emitting member 39 as a light emitting member that are disposed on the second surface 35*b*. The third light emitting member 38 and the fourth light emitting member 39 have a shape following the case inner wall 2*c*. The third light emitting member 38 is disposed on the 12 o'clock direction 19 side of the dial 5. The fourth light emitting member 39 is disposed on the 6 o'clock direction 17 side of the dial 5. Because the third light emitting member 38 and the fourth light emitting member 39 have a shape that follows the case inner wall 2*c*, the user can easily grasp the size and orientation of the electronic watch 1 by viewing the third light emitting member 38 and the fourth light emitting member 39.

The hour hand 7 includes a fifth light emitting member 41 as a light emitting member on the surface thereof on the crystal 3 side. The minute hand 8 includes a sixth light emitting member 42 as a light emitting member on the surface thereof on the crystal 3 side. Through the crystal 3, the user can recognize the dial 5, the first light emitting member 36, the second light emitting member 37, the third light emitting member 38, and the fourth light emitting member 39. The hour hand 7 includes a fifth light emitting member 41, and the minute hand 8 includes a sixth light emitting member 42. The user recognizes the hour hand 7 and the minute hand 8 with the fifth and sixth light emitting members 41 and 42. Thus, even in dark water, the position of the hour hand 7 and the minute hand 8 can be recognized.

Figure 9:
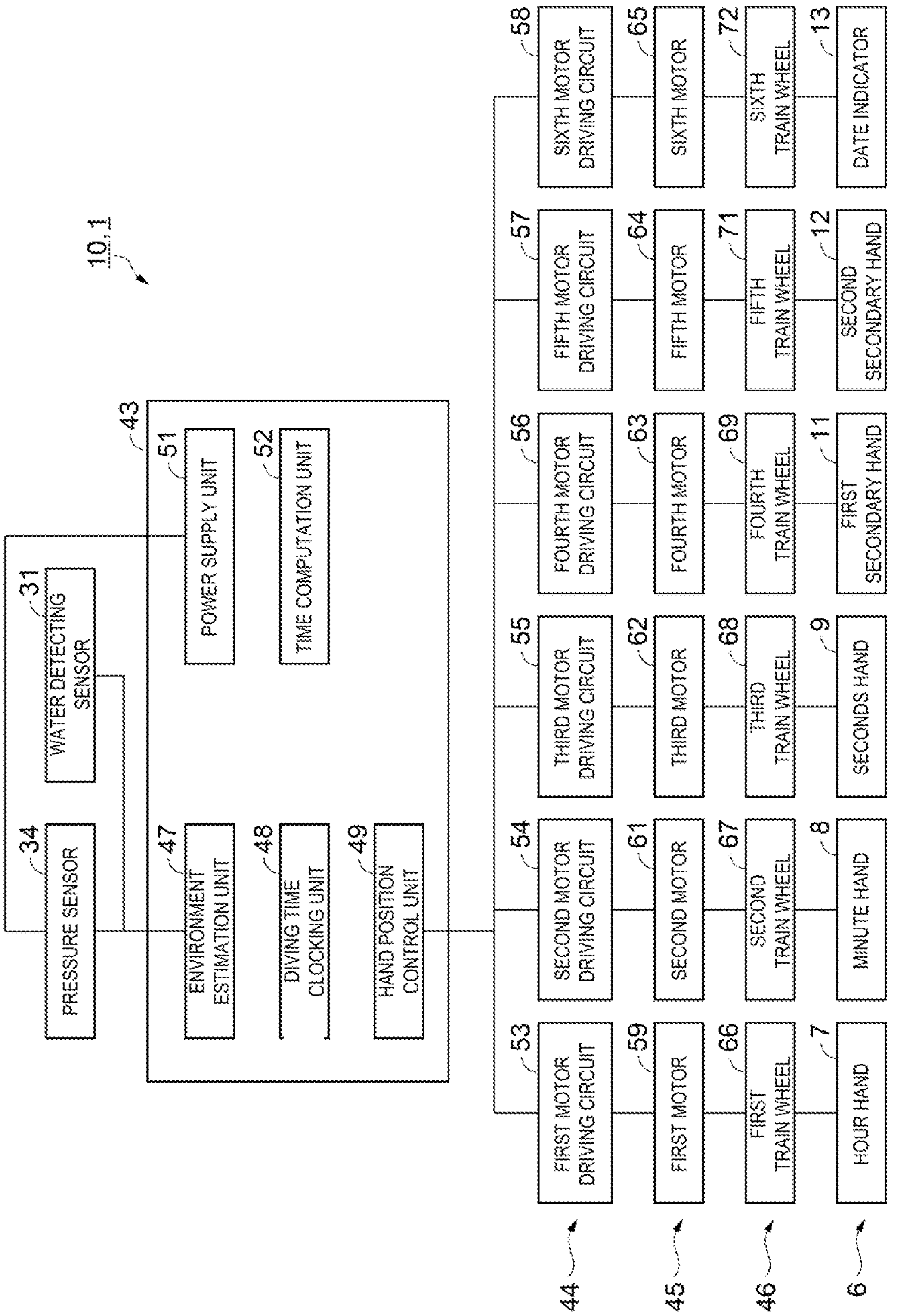
FIG. 9 is a block diagram illustrating a configuration of an electronic watch.

As illustrated in FIG. 9, the movement 10 includes a pressure sensor 34, a water detection sensor 31, a control device 43 as a controller, a motor driving circuit 44, a motor 45, and a train wheel 46. Although not illustrated, a oscillator circuit using a crystal oscillator, a battery serving as a power source, and the like are also provided on the movement 10. The pressure sensor 34 measures the pressure applied to the electronic watch 1 and outputs to the control device 43.

The control device 43 is configured by a Micro Controller Unit (MCU) or the like, and includes an environment estimation controller 47, a diving time clocking controller 48, a hand position controller 49, a power supply controller 51, a time computation controller 52, and the like.

The environment estimation controller 47 is a processor configured to estimate, based on a measurement value of the pressure sensor 34, whether or not the watch is diving (under water), and when watch is diving, estimate a depth, that is, the water depth. When a detection signal, which can be determined that the electronic watch 1 entered into water, is input to the environment estimation controller 47 from the water detection sensor 31, the environment estimation controller 47 outputs an entry-into-water signal to the power supply controller 51. Upon receiving the entry-into-water signal, the power supply controller 51 supplies power from the battery to the pressure sensor 34. The pressure sensor 34 begins measuring pressure when power is supplied. The pressure sensor 34 performs pressure measurement at a predetermined time interval, for example, every one second, and outputs the measured value to the environment estimation controller 47. The environment estimation controller 47 determines the water depth based on the output from the pressure sensor 34.

The environment estimation controller 47 determines that diving is initiated when the measured value of the pressure sensor 34 exceeds a predetermined value corresponding to a preset water depth. In electronic watch 1, the Snorkeling mode and the Dive mode can be selected. For this reason, the predetermined value for determining the initiation of diving is set to a threshold value of 50 cm of water depth in the Snorkeling mode, and a water depth threshold value of 1.5 m is set in the Dive mode.

When a detection signal for determining that the electronic watch 1 exited the water, is input to the environment estimation controller 47 from the water detection sensor 31, the environment estimation controller 47 outputs a exit-from-water signal to the power supply controller 51. The power supply 51 stops supplying power to the pressure sensor 34 upon receiving the exit-from-water signal. The pressure sensor 34 stops measuring the pressure when the power supply is stopped. When the water detection sensor 31 detected again that the electronic watch 1 entered the water, the environment estimation controller 47 starts the pressure sensor 34 again, and when the water detection sensor 31 detected that the electronic watch 1 exited the water, the pressure sensor 34 is stopped again. In this way, the control device 43 supplies power to the pressure sensor 34 when the control device 43 determines, based on the output from the water detection sensor 31, that the electronic watch 1 entered the water. Accordingly, the power consumption can be reduced compared with a case where power is constantly supplied to the pressure sensor 34.

The diving time clocking controller 48 clocks the elapsed time after the predetermined water depth value is exceeded. The elapsed time from a time point when the environment estimation controller 47 determines that the diving is initiated, i.e., the diving time, is timed. The diving time clocking controller 48 can be implemented, for example, by a counter counting a reference signal output from the oscillator circuit.

The hand position controller 49 is a processor configured to receive orders instructing the display of various diving information, such as the water depth estimated by the environment estimation controller 47, the diving time measured by the diving time clocking controller 48, and to calculate the hand positions for the hands 6 in order to display the diving information, to calculate the difference in the hand positions for each of the hands at that point in time, that is, the amount of movement of the hands, and to output a drive order to the motor driving circuit 44. In the embodiment, the electronic watch 1 is provided with five hands 6 including the hour hand 7, the minute hand 8, the seconds hand 9, the first secondary hand 11, and the second secondary hand 12. The hand position controller 49 controls the movement of each hand 6 and the date indicator 13.

The time computation controller 52 is input the output of the oscillator circuit using the crystal oscillator, and calculates the time lapse. In the time display mode, the time computation controller 52 outputs a current time signal indicating the current time to the hand position controller 49.

The motor driving circuit 44 is a driving circuit that supplies drive current to the coil of the motor 45 to drive the motor 45. The motor driving circuit 44 is configured of a first motor driving circuit 53, a second motor driving circuit 54, a third motor driving circuit 55, a fourth motor driving circuit 56, a fifth motor driving circuit 57, and a sixth motor driving circuit 58. The motor driving circuit 44 is controlled by the hand position controller 49.

The motor 45 is a stepping motor used for a watch. The motor 45 is configured of a first motor 59, a second motor 61, a third motor 62, a fourth motor 63, a fifth motor 64, and a sixth motor 65. The first motor 59, the second motor 61, the third motor 62, the fourth motor 63, the fifth motor 64, and the sixth motor 65 are respectively driven by a first motor driving circuit 53, a second motor driving circuit 54, a third motor driving circuit 55, a fourth motor driving circuit 56, a fifth motor driving circuit 57, and a sixth motor driving circuit 58.

The train wheel 46 is configured to convey the rotational force of the rotor of the motor 45 to drive each of the hands 6. The train wheel 46 is configured of a first train wheel 66, a second train wheel 67, a third train wheel 68, a fourth train wheel 69, a fifth train wheel 71, and a sixth train wheel 72. The first train wheel 66, second train wheel 67, third train wheel 68, fourth train wheel 69, fifth train wheel 71 and sixth train wheel 72 are respectively driven by a first motor 59, a second motor 61, a third motor 62, a fourth motor 63, a fifth motor 64, and a sixth motor 65.

The hour hand 7 is driven by the first motor 59 and the first train wheel 66. The minute hand 8 is driven by the second motor 61 and the second train wheel 67. The seconds hand 9 is driven by the third motor 62 and the third train wheel 68. The first secondary hand 11 is driven by the fourth motor 63 and the fourth train wheel 69. The second secondary hand 12 is driven by the fifth motor 64 and the fifth train wheel 71. The date indicator 13 is driven by the sixth motor 65 and the sixth train wheel 72.

The control device 43 instructs the hand position controller 49 to indicate the water depth with the hour hand 7, and instructs the minute hand 8 to indicate the elapsed time after the predetermined water depth value is exceeded. Unlike with typical electronic watches including bezels, by not providing a bezel, a large display area can be ensured. Accordingly, an electronic watch 1 that facilitates reading of the information of time, diving time, and water depth with the large display area, can be provided.

In the time display mode indicating the time of day, the hour hand 7 indicates the hour and the minute hand 8 indicates the minute. In the diving mode, the hour hand 7 indicates the water depth, and the minute hand 8 indicates the diving time. Thus, time, water depth, and diving time can be displayed using the hour hand 7 and the minute hand 8.

Second Exemplary Embodiment

In the first embodiment, the water detection sensor 31 detects entry into water and exit from water, and the pressure sensor 34 detects water pressure, which is the pressure of the water. The hour hand 7 displays water depth and the minute hand 8 displays the diving time. In addition, the electronic watch may include an atmospheric pressure sensor, an orientation sensor, and a Global Positioning System (GPS). The hands 6 may indicate atmospheric pressure, altitude, and orientation. GPS may be utilized to correct the time. At this time as well, an electronic watch that facilitates recognition of the information of accurate time, pressure, and orientation with the large display area, can be provided.

In addition, the electronic watch may include an illuminance sensor, and a solar panel. The hands 6 may indicate a power generation amount. At this time as well, an electronic watch that facilitates recognition of the information of time and power generation with the large display area, can be provided.

In addition, the electronic watch may include an inertial sensor. The hands 6 may indicate the number of steps, calories burned, and walking distance of the user. At this time, an electronic watch that facilitates recognition of the information of the number of steps, calories burned, and walking distance of the user with the large display area, can be provided.

In addition, the electronic watch may include a temperature sensor, and ultraviolet (UV) sensor. The hands 6 may indicate temperature and UV light intensity. At this time as well, an electronic watch that facilitates recognition of the information of temperature and UV light intensity with the large display area, can be provided.

What is claimed is:

1. An electronic watch comprising:
a case including an opening;
a crystal disposed at the opening;
a first hand and a second hand that indicate a time;
a dial including an indicium;
a water detection sensor configured to detect a first state in which the electronic watch enters into water and a second state in which the electronic watch exits from the water;
a pressure sensor configured to measure a pressure; and
a controller configured to:
receive a first signal indicating the first state and a second signal indicating the second state;
supply power to the pressure sensor to cause the pressure sensor to measure the pressure in response to the first signal;
determine a water depth based on an output from the pressure sensor;
indicate the water depth with the first hand;
indicate, with the second hand, an elapsed time after a predetermined water depth value is exceeded; and stop the supply of the power to the pressure sensor to cause the pressure sensor to stop the measurement of the pressure in response to the second signal.

2. The electronic watch according to claim 1, wherein the opening is polygonal.

3. The electronic watch according to claim 2, wherein a distance from an intermediate point of a virtual line connecting the indicium at 4 o'clock and the indicium at 5 o'clock to an inner wall of the case, and a distance from an intermediate point of a virtual line connecting the indicium at 7 o'clock and the indicium at 8 o'clock to the inner wall of the case are greater than the each of distances from the indicium at 12 o'clock, the indicium at 3 o'clock, and the indicium at 9 o'clock to the inner wall of the case.

4. The electronic watch according to claim 1, wherein the first hand indicates an hour and the second hand indicates a minute, for indicating the time.

5. The electronic watch according to claim 3, the electronic watch comprising:

a light-transmissive member disposed between the crystal and the dial, the light transmissive member including a first surface facing the crystal and a second surface having a front and rear relationship with the first surface, the second surface facing the dial, wherein the first surface, the second surface, the first hand, and the second hand have first, second, third, and fourth light emitting members, respectively.

6. The electronic watch according to claim 5, wherein the second light emitting member disposed at the second surface of the light-transmissive member has a shape following the inner wall of the case.

* * * * *